(12) United States Patent
Colville

(10) Patent No.: US 9,869,882 B1
(45) Date of Patent: Jan. 16, 2018

(54) TENSIONING KIT FOR SPECTACLES

(71) Applicant: George Colville, Olive Branch, MS (US)

(72) Inventor: George Colville, Olive Branch, MS (US)

(\*) Notice: Subject to any disclaimer, the term of this patent is extended or adjusted under 35 U.S.C. 154(b) by 0 days.

(21) Appl. No.: 15/296,370

(22) Filed: Oct. 18, 2016

(51) Int. Cl.
*G02C 5/16* (2006.01)
*G02C 5/22* (2006.01)
*G02C 11/00* (2006.01)
*G02C 5/14* (2006.01)

(52) U.S. Cl.
CPC ........... *G02C 5/2254* (2013.01); *G02C 5/146* (2013.01); *G02C 5/2209* (2013.01); *G02C 11/00* (2013.01); *G02C 2200/16* (2013.01)

(58) Field of Classification Search
CPC .... G02C 5/2254; G02C 5/2209; G02C 11/00; G02C 5/146; G02C 2200/16
USPC ............................................ 351/41, 111, 113
See application file for complete search history.

(56) References Cited

U.S. PATENT DOCUMENTS

| 3,156,757 | A | | 11/1964 | Spina | |
|---|---|---|---|---|---|
| 3,387,910 | A | | 6/1968 | Giraldi | |
| 3,428,392 | A | * | 2/1969 | Chaney | G02C 5/00 351/113 |
| 3,920,317 | A | | 11/1975 | Kell | |
| 3,923,384 | A | * | 12/1975 | Leblanc | G02C 5/2254 16/228 |
| 4,932,771 | A | * | 6/1990 | Nowottny | G02C 5/10 351/113 |
| 5,155,507 | A | * | 10/1992 | Ford | G02C 5/10 351/111 |
| 6,019,467 | A | * | 2/2000 | Kawamoto | G02C 5/10 16/228 |
| D603,694 | S | | 11/2009 | Bushey | |
| 2,761,353 | A1 | | 6/2012 | Paluncic | |

FOREIGN PATENT DOCUMENTS

EP 0457026 A2 11/1991

\* cited by examiner

*Primary Examiner* — Tuyen Tra
(74) *Attorney, Agent, or Firm* — Kyle A. Fletcher, Esq.

(57) ABSTRACT

The tensioning kit for spectacles comprises an elastic pad and a blocking post. The elastic pad and the blocking post are attached to the temple of the eyeglasses. The tensioning kit for spectacles is a device that inhibits the rotation of the temple of eyeglasses such that the temple is pressed against the head of the user in a manner that places a strain on the temple that deforms the temple. As the temple attempts to return to its relaxed shape, a force is exerted against the head of the user thus holding the eyeglasses in position. The tension applied is a function of the span of the arc that is inhibited by the tensioning kit for spectacles.

20 Claims, 3 Drawing Sheets

TENSIONING KIT FOR SPECTACLES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of optics including spectacles, more specifically, a non-optical part comprising a tensioning side member of the spectacle frame.

SUMMARY OF INVENTION

The tensioning kit for spectacles is a device designed for use with eyeglasses. The eyeglasses further comprises a temple, an end piece, and a hinge. The temple is further defined with a first end. As shown most clearly in FIG. 3, the hinge attaches the temple to the end piece in the manner of a cantilever. The hinge attaches the temple to the end piece such that the first end rotates against or away from the end piece. The temple is formed as a semi-rigid structure. The tensioning kit for spectacles is a device that inhibits the rotation of the first end of the temple such that the temple is pressed against the head of the user in a manner that places a strain on the temple that deforms the temple. As the temple attempts to return to its relaxed shape, a force is exerted against the head of the user thus holding the eyeglasses in position. The tension applied is a function of the span of the arc that is inhibited by the tensioning kit for spectacles.

These together with additional objects, features and advantages of the tensioning kit for spectacles will be readily apparent to those of ordinary skill in the art upon reading the following detailed description of the presently preferred, but nonetheless illustrative, embodiments when taken in conjunction with the accompanying drawings.

In this respect, before explaining the current embodiments of the tensioning kit for spectacles in detail, it is to be understood that the tensioning kit for spectacles is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tensioning kit for spectacles.

It is therefore important that the claims be regarded as including such equivalent construction insofar as they do not depart from the spirit and scope of the tensioning kit for spectacles. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
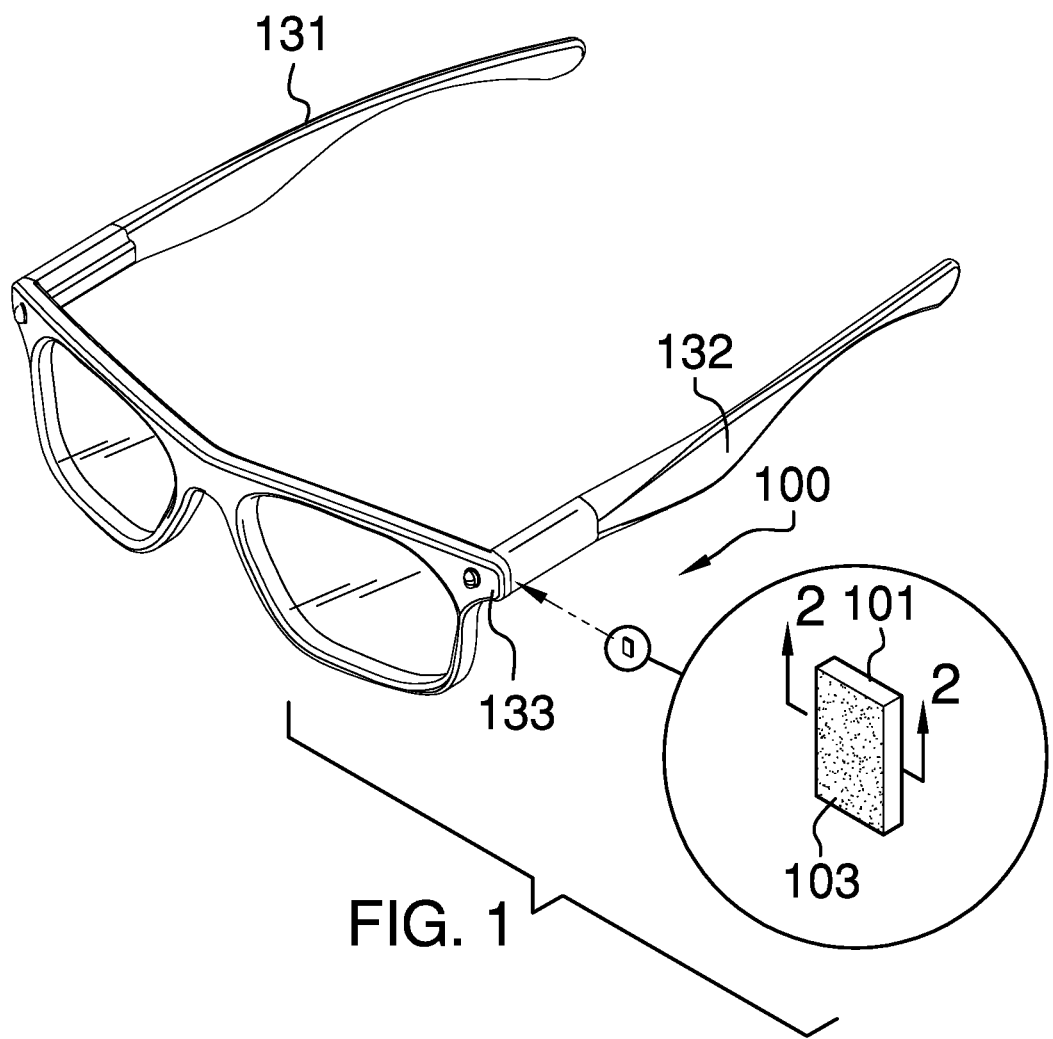
FIG. 1 is a perspective view of an embodiment of the disclosure.
Figure 2:
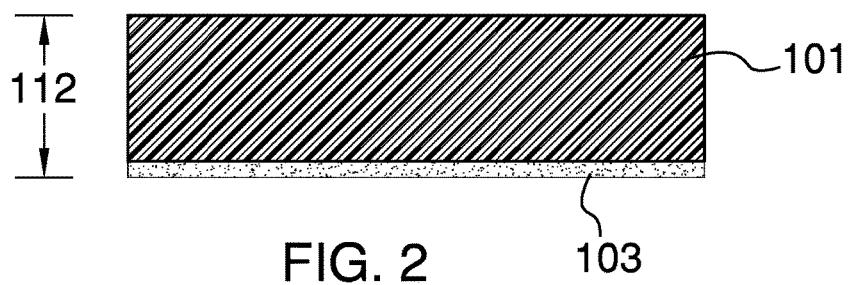
FIG. 2 is a cross-sectional view of an embodiment of the disclosure across 2-2 as shown in FIG. 1.
Figure 3:
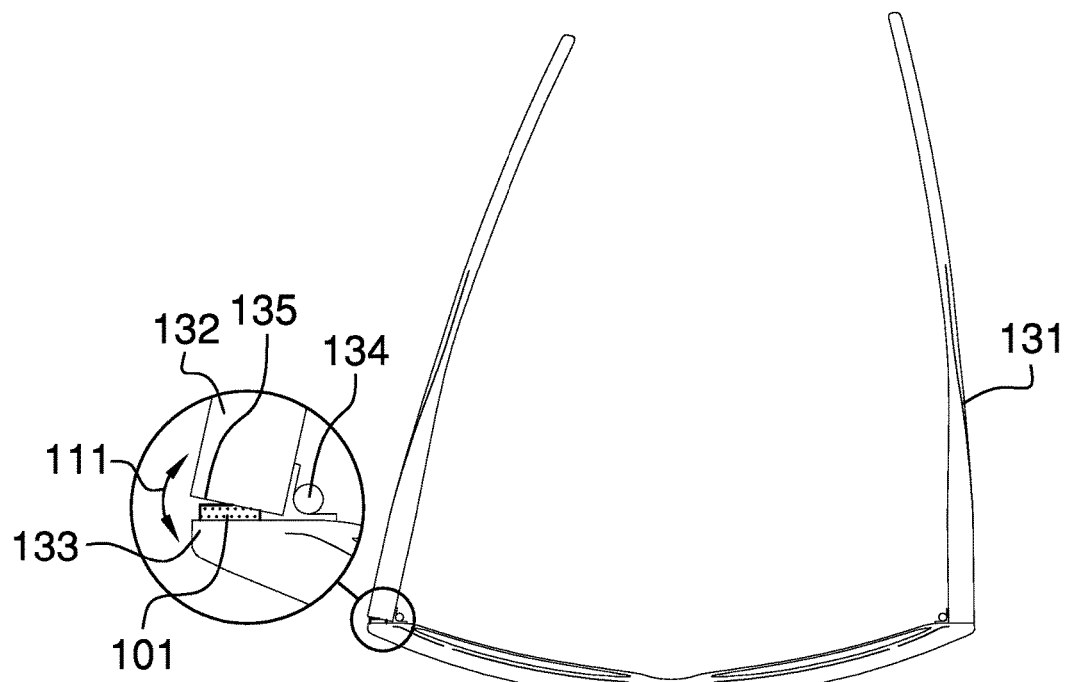
FIG. 3 is a top view of an embodiment of the disclosure.
Figure 4:
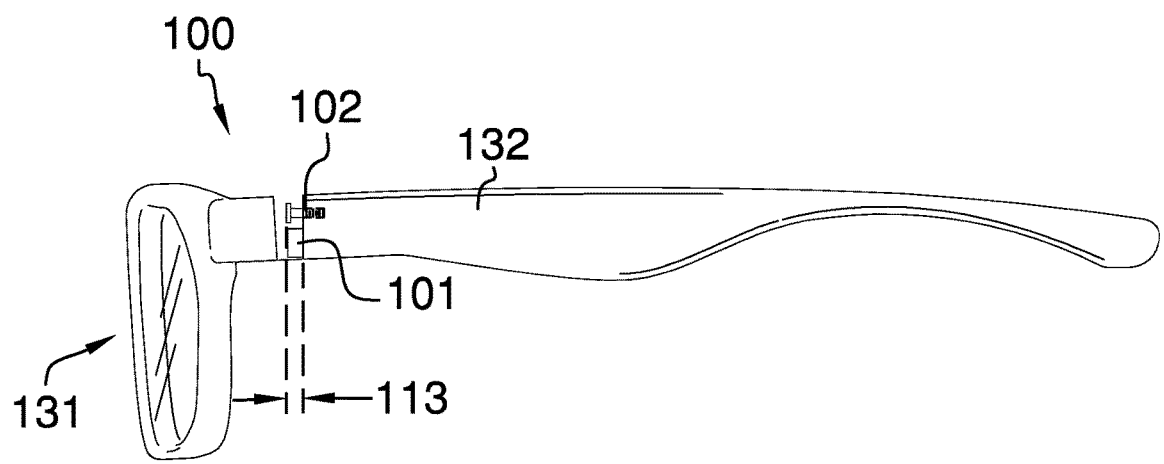
FIG. 4 is a side view of an embodiment of the disclosure.
Figure 5:
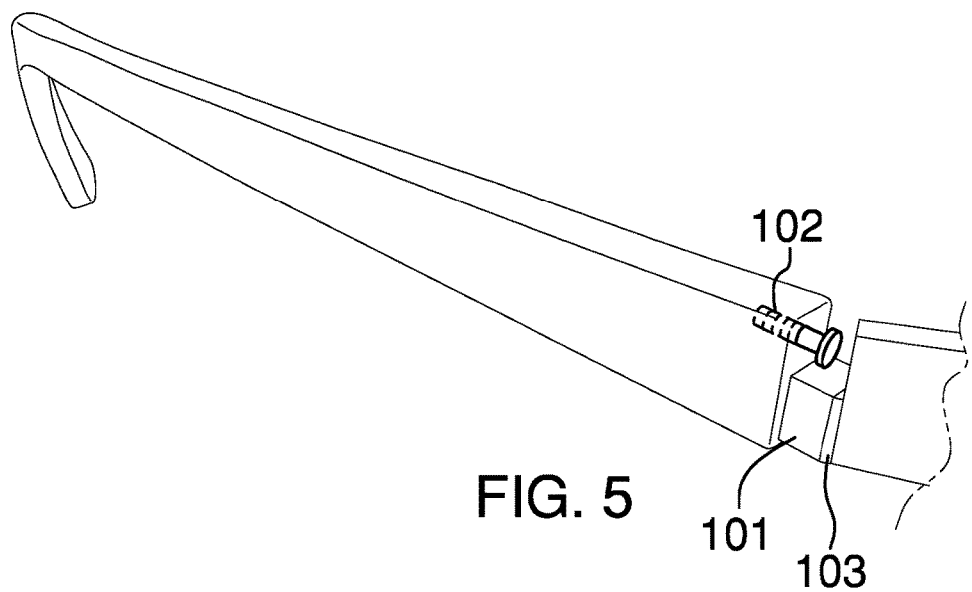
FIG. 5 is a detail view of an embodiment of the disclosure.

Detailed reference will now be made to one or more potential embodiments of the disclosure, which are illustrated in FIGS. 1 through 5.

The tensioning kit for spectacles 100 (hereinafter invention) is a device designed for use with eyeglasses 131. The eyeglasses 131 further comprises a temple 132, an end piece 133, and a hinge 134. The temple 132 is further defined with a first end 135. As shown most clearly in FIG. 3, the hinge 134 attaches the temple 132 to the end piece 133 in the manner of a cantilever. The hinge 134 attaches the temple 132 to the end piece 133 such that the first end 135 rotates against or away from the end piece 133. The temple 132 is formed as a semi-rigid structure. The invention 100 is a device that inhibits the rotation of the first end 135 of the temple 132 such that the temple 132 is pressed against the head of the user in a manner that places a strain on the temple 132 that deforms the temple 132. As the temple 132 attempts to return to its relaxed shape, a force is exerted against the head of the user thus holding the eyeglasses 131 in position. The tension applied is a function of the span of the arc 111 that is inhibited by the invention 100. The invention 100 comprises an elastic pad 101 and a blocking post 102. The elastic pad 101 and the blocking post 102 are attached to the first end 135 of the temple 132 of the eyeglasses 131.

The elastic pad 101 is a rectangular block shaped semi-rigid structure that is formed from an elastomeric material. The elastic pad 101 is further defined with a thickness 112. The elastic pad 101 is mounted on the first end 135 of the temple 132 such that if the first end 135 were rotated such that the first end 135 was pressed flat against the end piece 133 the elastic pad 101 would under maximum compressive force. The resistance to the compressive force of the elastic pad 101 as the temple 132 is rotated into the end piece 133 is the force that presses the temple 132 into the head of the user. The tension applied by the use of the elastic pad 101 can be adjusted by adjusting the span of the thickness 112 of the elastic pad 101. The larger the span of the thickness 112 of the elastic pad 101 the greater the tension applied.

In the first potential embodiment of the disclosure, the elastic pad 101 is formed from a polyurethane foam. The elastic pad 101 is attached to the first end 135 using a cyanoacrylate adhesive 103.

The blocking post 102 is a rigid cylindrical structure that projects perpendicularly away from the first end 135 such that the blocking post 102 will press against the end piece 133 when the first end 135 is rotated into the end piece 133. The function of the blocking post 102 is to act as a chock that inhibits the rotation of the temple 132 in a manner similar to the operation of the elastic pad 101. The rigid structure of the blocking post 102 makes the blocking post 102 a simple stop device that physically prevents further rotation of the first end 135 towards the end piece 133. The tension applied by the blocking post 102 is a function of the span of the projection 113 of the blocking post 102 away from the first end 135. The greater the span of the projection 113 the greater the tension applied.

In the first potential embodiment of the disclosure, the blocking post 102 is a screw that is screwed into the first end 135 of the temple 132. The depth into the first end 135 into which the screw is screwed will determine the span of the projection 113 of the blocking post 102.

The blocking post 102 and the elastic pad 101 work together to provide tension to the eyeglasses 131. Specifically, the blocking post 102 is set to apply a minimum tension to the eyeglasses 131. The elastic pad 101 provides a variable resistance because of the non-linear nature of the compression of the elastomeric material in response to the applied force. Specifically, in most common elastomeric materials, including those described in this disclosure, the change in compression will decrease for each additional unit of force applied to the material. This allows the invention 100 to dynamically adjust the force required by the user to hold the eyeglasses 131 in position. In addition, the elastic pad 101 will absorb any torqueing or other transient forces applied to the eyeglasses 131 during normal daily use. This "shock absorbing" function prevents the invention 100 from damaging the eyeglasses 131.

Once the invention 100 is applied as described above, the eyeglasses 131 are worn normally.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Cantilever: As used in this disclosure, a cantilever is a beam or other structure that projects away from an object and is supported on only one end. Within this disclosure, the cantilever acts as a spring. Specifically, when a force is applied perpendicularly to the surface of the cantilever, the elasticity of the cantilever creates a rotational torque that opposes the displacement created by rotating the cantilever around a pivot point located at the first end where the cantilever is attached to the receptacle. This rotational torque places a strain on the cantilever such that the force of the strain is in the direction that returns the cantilever to its original position. When an object is inserted between the cantilever and the receptacle, this spring like action produces a clamping force that holds the object securely in position.

Elastic: As used in this disclosure, an elastic is a material or object that deforms when a force is applied to it and that is able to return to its original shape after the force is removed. A material that exhibits these qualities is also referred to as an elastomeric material.

Eyeglasses: As used in this disclosure, eyeglasses are a pair of lenses held in a frame that are worn over the eyes. Eyeglasses are used to help with vision. Spectacles are a synonym for eyeglasses.

Hinge: As used in this disclosure, a hinge is a device that permits the turning, rotating, or pivoting of a first object relative to a second object.

Pivot: As used in this disclosure, a pivot is a rod or shaft around which an object rotates or swings.

Relaxed Shape: As used in this disclosure, a structure is considered to be in its relaxed state when no shear, strain, or torsional forces are being applied to the structure.

Rigid Structure: As used in this disclosure, a rigid structure is a solid structure that is inflexible and will not deform before breaking under a force.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tensioning device comprising:
wherein the tensioning device comprises an elastic pad and a blocking post;
wherein the tensioning device is attached to a pair of eyeglasses;
wherein the pair of eyeglasses further comprises a temple, an end piece, and a hinge;
wherein the temple is further defined with a first end;
wherein the hinge attaches the temple to the end piece in the manner of a cantilever;
wherein the hinge attaches the temple to the end piece such that the first end rotates against or away from the end piece;
wherein the temple is formed as a first semi-rigid structure;
wherein the elastic pad and the blocking post are attached to the first end of the temple of the pair of eyeglasses.

2. The tensioning device according to claim 1
wherein the elastic pad is a rectangular block shaped semi-rigid structure;
wherein the elastic pad is formed from an elastomeric material;
wherein the elastic pad is further defined with a thickness.

3. The tensioning device according to claim 2 wherein the elastic pad is mounted on the first end of the temple such that if the first end were rotated such that the first end was pressed flat against the end piece the elastic pad would under maximum compressive force.

4. The tensioning device according to claim 3 wherein the tension applied by the elastic pad is adjustable.

5. The tensioning device according to claim 4 wherein the tension applied by the elastic pad is adjusted by adjusting the span of the thickness of the elastic pad.

6. The tensioning device according to claim 5 wherein the elastic pad is formed from a polyurethane foam.

7. The tensioning device according to claim 6 wherein the elastic pad is attached to the first end using an adhesive.

8. The tensioning device according to claim 7 wherein the adhesive is a cyanoacrylate adhesive.

9. The tensioning device according to claim 1
wherein the blocking post is a rigid cylindrical structure;
wherein the blocking post projects perpendicularly away from the first end such that the blocking post will press against the end piece when the first end is rotated against the end piece.

10. The tensioning device according to claim 9 wherein the blocking post physically prevents rotation of the first end towards the end piece past a predetermined point.

11. The tensioning device according to claim 10 wherein the tension applied by the blocking post is adjustable.

12. The tensioning device according to claim 11 wherein the tension applied by the blocking post is adjusted by adjusting span of the projection of the blocking post away from the first end.

13. The tensioning device according to claim 12
wherein the elastic pad is a rectangular block shaped semi-rigid structure;
wherein the elastic pad is formed from an elastomeric material;
wherein the elastic pad is further defined with a thickness.

14. The tensioning device according to claim 13 wherein the elastic pad is mounted on the first end of the temple such that if the first end were rotated such that the first end was pressed flat against the end piece the elastic pad would under maximum compressive force.

15. The tensioning device according to claim 14 wherein the tension applied by the elastic pad is adjustable.

16. The tensioning device according to claim 15 wherein the tension applied by the elastic pad is adjusted by adjusting the span of the thickness of the elastic pad.

17. The tensioning device according to claim 16 wherein the elastic pad is formed from a polyurethane foam.

18. The tensioning device according to claim 17 wherein the blocking post is a screw that is screwed into the first end of the temple.

19. The tensioning device according to claim 18 wherein the depth into the first end into which the screw is screwed determines the span of the projection of the blocking post.

20. The tensioning device according to claim 19
wherein the elastic pad is attached to the first end using an adhesive;
wherein the adhesive is a cyanoacrylate adhesive.

* * * * *